US011898358B2

(12) United States Patent
Morimura et al.

(10) Patent No.: US 11,898,358 B2
(45) Date of Patent: Feb. 13, 2024

(54) BINDING MACHINE

(71) Applicant: MAX CO., LTD., Tokyo (JP)

(72) Inventors: Kouichirou Morimura, Tokyo (JP); Yusuke Yoshida, Tokyo (JP); Makoto Kosuge, Tokyo (JP); Tetsuro Fukuda, Tokyo (JP)

(73) Assignee: Max Co., Ltd., Tokyo (JP)

( * ) Notice: Subject to any disclaimer, the term of this patent is extended or adjusted under 35 U.S.C. 154(b) by 2 days.

(21) Appl. No.: 17/720,842

(22) Filed: Apr. 14, 2022

(65) Prior Publication Data

US 2022/0333390 A1 Oct. 20, 2022

(30) Foreign Application Priority Data

Apr. 16, 2021 (JP) ................................ 2021-069930

(51) Int. Cl.
*E04G 21/12* (2006.01)
*B25B 25/00* (2006.01)
*B25B 28/00* (2006.01)

(52) U.S. Cl.
CPC ............ *E04G 21/123* (2013.01); *B25B 25/00* (2013.01); *B25B 28/00* (2013.01)

(58) Field of Classification Search
CPC . B21F 15/04; B21F 7/00; B65B 13/28; B65B 13/025; B65B 13/285; B65B 13/04; B65B 13/06; B65B 27/10; B65B 13/185; B65B 13/184; E04G 21/123; B25B 25/00
See application file for complete search history.

(56) References Cited

U.S. PATENT DOCUMENTS 4,865,087 A * 9/1989 Geiger .................. B65B 13/285 140/57
5,682,927 A * 11/1997 Takahashi ............. E04G 21/123 140/119
5,871,036 A 2/1999 Murayama et al.
(Continued)

FOREIGN PATENT DOCUMENTS

EP 3327224 A1 5/2018
EP 3342954 A1 7/2018
JP 3013880 B2 2/2000

OTHER PUBLICATIONS

Extended European Search Report for European Application No. 22168380.8 dated Sep. 21, 2022. (7 pages).

*Primary Examiner* — Adam J Eiseman
*Assistant Examiner* — Bobby Yeonjin Kim
(74) *Attorney, Agent, or Firm* — Banner & Witcoff, Ltd.

(57) ABSTRACT

A binding machine includes a wire feeder, a curl forming part, a cutter, and a binding part configured to twist the wire wound on the object and cut by the cutter. The binding part includes a wire locking body to which the wire is locked; a rotating shaft configured to operate the wire locking body; and a wire holding part including a first member and a second member. The wire holding part is configured to bend the wire wound on the object in an axial direction of the rotating shaft by the relative movement of the first member and the second member approaching each other, and to hold the wire. The cutter is provided in a wire feeding path between the wire feeder and the wire holding part, and is configured to cut the wire after the wire is held by the wire holding part.

9 Claims, 7 Drawing Sheets

(56) References Cited

U.S. PATENT DOCUMENTS

| | | | | |
|---|---|---|---|---|
| 5,913,341 | A * | 6/1999 | Jones | E04G 21/123 52/750 |
| 2005/0005991 | A1* | 1/2005 | Ishikawa | E04G 21/123 140/119 |
| 2005/0005992 | A1* | 1/2005 | Kusakari | B21F 15/06 140/119 |
| 2012/0111206 | A1* | 5/2012 | Barnes | E04G 21/123 100/8 |
| 2012/0118176 | A1* | 5/2012 | Gregersen | B65B 13/22 100/2 |
| 2018/0155940 | A1* | 6/2018 | Nagaoka | E04G 21/123 |
| 2018/0207710 | A1* | 7/2018 | Itagaki | B65B 13/285 |
| 2018/0363309 | A1* | 12/2018 | Kusakari | E04G 21/122 |

* cited by examiner

BINDING MACHINE

CROSS-REFERENCE TO RELATED APPLICATIONS

This application claims priority to Japanese Patent Application No. 2021-069930 filed on Apr. 16, 2021, the content of which is incorporated herein by reference.

TECHNICAL FIELD

The present disclosure relates to a binding machine for binding an object to be bound such as a reinforcing bar or the like with a wire.

BACKGROUND ART

Reinforcing bars are used in concrete structures to improve their strength, and the reinforcing bars are bound with wires so as not to be shifted from the specified position upon concrete placement.

A binding machine called a reinforcing bar binding machine has been proposed, which winds a wire around two or more reinforcing bars and twists the wire wound on the reinforcing bars to thus bind the two or more reinforcing bars with the wire.

When binding the reinforcing bars with the wire, since loose binding can allow displacement of the reinforcing bars from each other, it is required to firmly hold the reinforcing bars together. Therefore, technique for enhancing binding force has been proposed, in which a twisting means for twisting the wire wound on the reinforcing bars is provided so as to approach or separate away from the reinforcing bars, in which the twisting means is biased by a coil spring in the rearward direction which is the direction of separating away from the reinforcing bar to thus apply tension to the wire, while twisting the wire (see, for example, JP 3013880 B).

However, in the binding machine that feeds and twists one or a plurality of wires, in such a configuration that draws back the excess wire to wind the wire on the reinforcing bars and then twists the wire wound on the reinforcing bars, when the wire wound on the reinforcing bars loosens after cutting the wire and before twisting the wire, the wire cannot be brought into close contact with the reinforcing bars.

SUMMARY OF INVENTION

The present disclosure has been made in order to solve the problem mentioned above, and an object of the present disclosure is to provide a binding machine capable of suppressing loosening of a wire when the wire wound on the object to be bound, that is, on the reinforcing bars is cut.

According to an embodiment of the present disclosure, there is provided a binding machine including: a wire feeder configured to feed a wire; a curl forming part making a path for looping the wire fed by the wire feeder in one direction around an object to be bound; a cutter configured to cut the wire fed by the wire feeder in another direction opposite to the one direction and wound on the object to be bound; and a binding part configured to twist the wire wound on the object to be bound and cut by the cutter. The binding part includes: a wire locking body to which the wire is locked; a rotating shaft configured to operate the wire locking body; and a wire holding part including a first member and a second member relatively movable in a direction of approaching each other and in a direction of separating away from each other, in which the wire holding part is configured to bend the wire, which is fed by the wire feeder in the another direction and wound on the object to be bound, in an axial direction of the rotating shaft by the relative movement of the first member and the second member approaching each other, and to hold the wire. The cutter is provided in a wire feeding path between the wire feeder and the wire holding part, and is configured to cut the wire after the wire is held by the wire holding part.

According to the embodiment of the present disclosure, the wire is locked, then the wire wound around the object to be bound is held by the wire holding part, after that the wire is cut by the cutter, and the wire cut by the cutter is bound by the binding part.

According to the embodiment of the present disclosure, it is possible to suppress loosening of the wire before twisting which is wound on the object to be bound and cut. As a result, it is possible to bring the wire into close contact with the object to be bound with the movement of twisting the wire.

DESCRIPTION OF EMBODIMENTS

Hereinafter, an example of a reinforcing bar binding machine as an embodiment of the binding machine according to the present disclosure will be described with reference to the drawings.

<Configuration Example of Reinforcing Bar Binding Machine According to Exemplary Embodiment>

Figure 1:
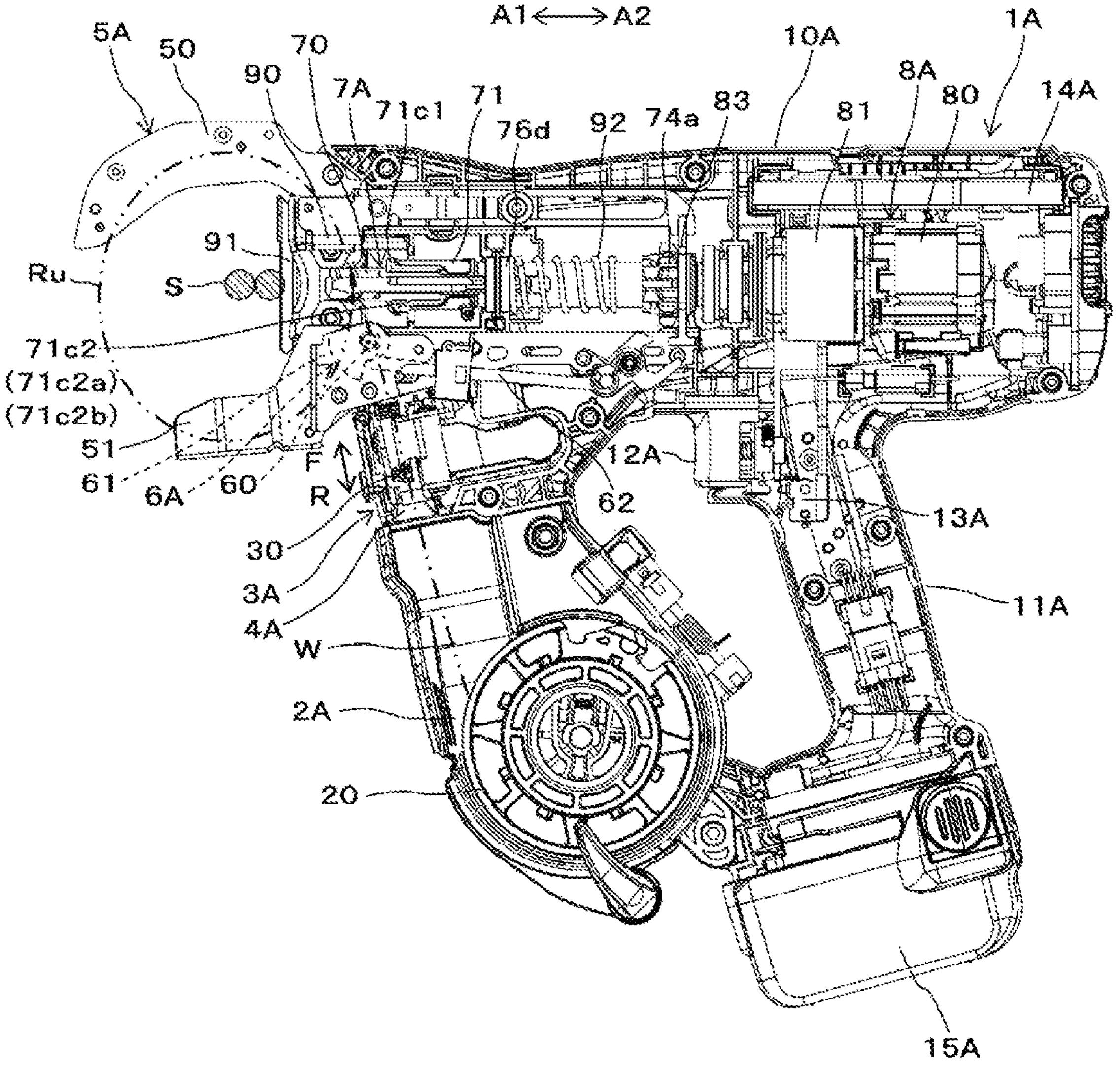
FIG. 1 is an internal configuration diagram, viewed from a side, illustrating an example of an overall configuration of a reinforcing bar binding machine according to an exemplary embodiment.

FIG. 1 is an internal configuration diagram, viewed from a side, illustrating an example of an overall configuration of a reinforcing bar binding machine according to an exemplary embodiment. A reinforcing bar binding machine 1A has such a form that the operator holds it in his/her hand to use, and includes a main body 10A and a handle 11A.

Further, the reinforcing bar binding machine 1A feeds a wire W in a positive direction as indicated by an arrow F to loop the wire W around reinforcing bars S that are the object to be bound, feeds the wire W looped around the reinforcing bars S in the reverse direction as indicated by an arrow R to wind the wire W on the reinforcing bars S and cuts the wire W, and then twists the wire W and binds the reinforcing bars S with the wire W.

In order to achieve the functions mentioned above, the reinforcing bar binding machine 1A includes a magazine 2A that houses the wire W, a wire feeder 3A that feeds the wire W, and a wire guide 4A that guides the wire W to be fed to the wire feeder 3A. Further, the reinforcing bar binding machine 1A includes a curl forming part 5A forming a path for looping the wire W fed by the wire feeder 3A around the reinforcing bars S, and a cutter 6A that cuts the wire W wound on the reinforcing bars S. Further, the reinforcing bar binding machine 1A includes a binding part 7A that twists the wire W wound on the reinforcing bars S, and a driving part 8A that drives the binding part 7A.

The magazine 2A is an example of a housing in which a reel 20 with a long wire W releasably wound thereon is rotatably and detachably housed. For the wire W, a wire made of a plastically deformable metal wire, a wire which is a metal wire coated with resin, or a stranded wire is used. One or a plurality of wires W are wound on a hub portion (not illustrated) of the reel 20, such that one, or simultaneously a plurality of wires W can be pulled out from the reel 20.

The wire feeder 3A includes a pair of feed gears 30 that hold one or a plurality of wires W in parallel therebetween to feed the wires. In the wire feeder 3A, a rotational movement of a feed motor (not illustrated) is transmitted to rotate the feed gears 30. As a result, the wire feeder 3A feeds the wire W held between the pair of feed gears 30 along an extending direction of the wire W. In a configuration in which a plurality of wires W such as, for example, two wires W are fed, the two wires W are fed in parallel.

In the wire feeder 3A, by switching between forward and reverse rotation directions of the feed motor (not illustrated), the rotation direction of the feed gear 30 can be switched, and the feeding direction of the wire W is switched between the positive direction which is one direction, and the reverse direction which is the other direction opposite to the one direction.

The wire guide 4A is provided at a predetermined position on the upstream side of the wire feeder 3A with respect to the feeding direction in which the wire W is fed in the positive direction. In a configuration in which two wires W are fed, the wire guide 4A restricts an orientation of the two wires W in a radial direction, arranges the two incoming wires W in parallel, and guides the wires between the pair of feed gears 30.

The wire guide 4A has a shape such that an opening on the downstream side with respect to the feeding direction of the wire W fed in the positive direction restricts the orientation of the wire W in the radial direction. On the other hand, an opening on the upstream side with respect to the feeding direction of the wire W fed in the positive direction has a larger opening area than the opening on the downstream side.

The curl forming part 5A includes a curl guide 50 that forms a winding curl with the wire W fed by the wire feeder 3A, and an inductive guide 51 that guides the wire W formed with the winding curl by the curl guide 50 to the binding part 7A. In the reinforcing bar binding machine 1A, the path of the wire W fed by the wire feeder 3A is restricted by the curl forming part 5A, so that the locus of the wire W forms a loop Ru as illustrated by a two-dot chain line in FIG. 1, and the wire W is looped around the reinforcing bars S.

The cutter 6A includes a fixed blade 60, a movable blade 61 that cuts the wire W in cooperation with the fixed blade 60, and a transmission mechanism 62 that transmits a movement of the binding part 7A to the movable blade 61. The cutter 6A cuts the wire W by the rotational movement of the movable blade 61 around the fixed blade 60 as a fulcrum axis. In a configuration that cuts a plurality of wires W such as two wires W for example, the fixed blade 60 and the movable blade 61 are configured such that the blade that cuts one of the two wires W and the blade that cuts the other wire W have irregularities along the relative moving direction due to the rotational movement of the movable blade 61 around the fixed blade 60 as the fulcrum axis, so that the cutting of the first wire W is started first, and then the cutting of the second wire W is started. As a result, the load at the start of cutting the wires W is decreased as compared with the case where the cutting of the two wires W is started at the same time.

The binding part 7A includes a wire locking body 70 to which the wire W is locked. The detailed configuration of the binding part 7A will be described below. The driving part 8A includes a motor 80 and a speed reducer 81 that decreases speed and amplifies torque.

In the reinforcing bar binding machine 1A, the curl guide 50 and the inductive guide 51 of the curl forming part 5A described above are provided at a front end of the main body 10A. Further, the reinforcing bar binding machine 1A includes a feed restriction part 90 to be contacted with a leading end of the wire W, on the feeding path of the wire W that is guided by the curl forming part 5A and locked by the wire locking body 70. Further, in the reinforcing bar binding machine 1A, a contacting portion 91 to be contacted with the reinforcing bars S is provided at a front end of the main body 10A between the curl guide 50 and the inductive guide 51.

In the reinforcing bar binding machine 1A, the handle 11A extends downward from the main body 10A. Further, a battery 15A is detachably attached to a lower portion of the handle 11A. Further, in the reinforcing bar binding machine 1A, the magazine 2A is provided in front of the handle 11A. In the reinforcing bar binding machine 1A, the wire feeder 3A, the cutter 6A, the binding part 7A, the driving part 8A for driving the binding part 7A, and the like described above are housed in the main body 10A.

In the reinforcing bar binding machine 1A, a trigger 12A is provided on a front side of the handle 11A, and a switch 13A is provided inside the handle 11A. In the reinforcing bar binding machine 1A, a control unit 14A controls the motor 80 and the feed motor (not illustrated) according to the state of the switch 13A pressed by the operation of the trigger 12A.

Figure 2A:
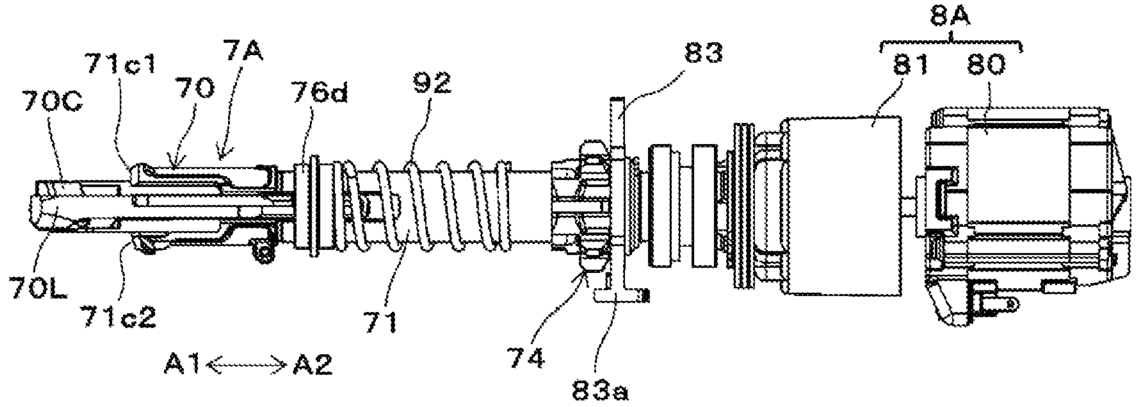
FIG. 2A is a side view illustrating a configuration of a main part of a reinforcing bar binding machine according to a first embodiment.
Figure 2B:
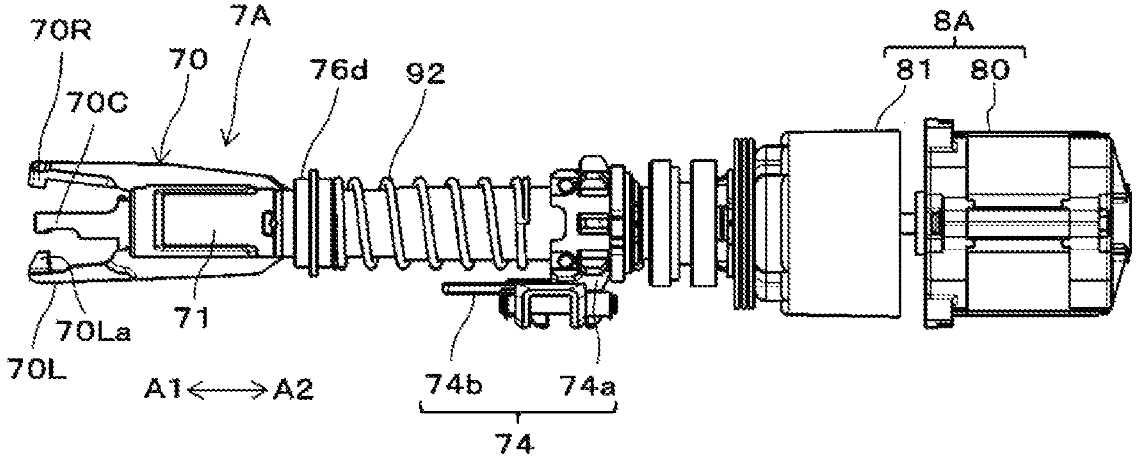
FIG. 2B is a top view illustrating the configuration of the main part of the reinforcing bar binding machine according to the first embodiment.
Figure 2C:
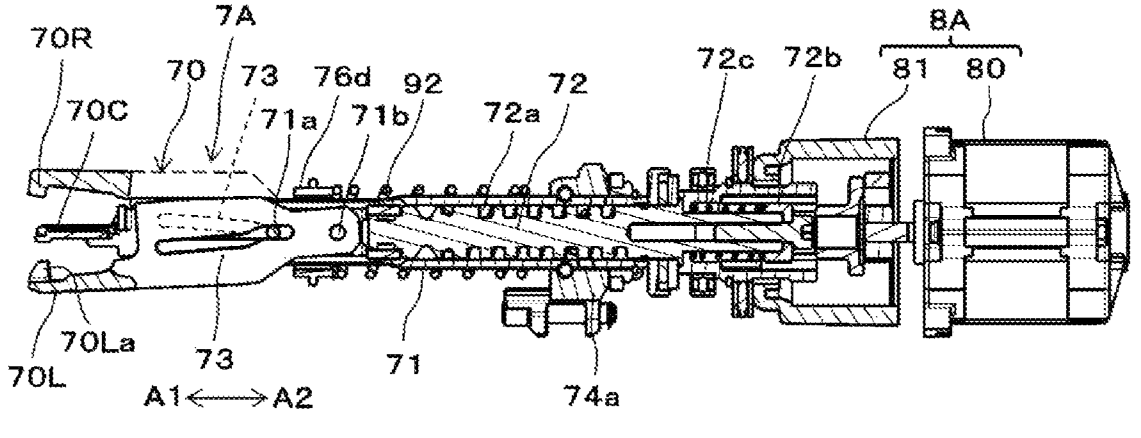
FIG. 2C is a top sectional view illustrating the configuration of the main part of the reinforcing bar binding machine according to the first embodiment.
Figure 3A:
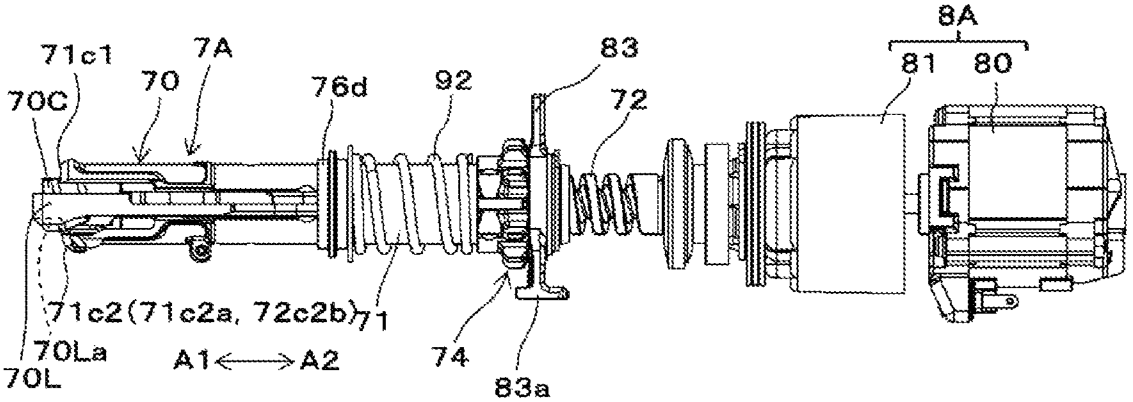
FIG. 3A is a side view illustrating the configuration of the main part of the reinforcing bar binding machine in operation according to the embodiment.
Figure 3B:
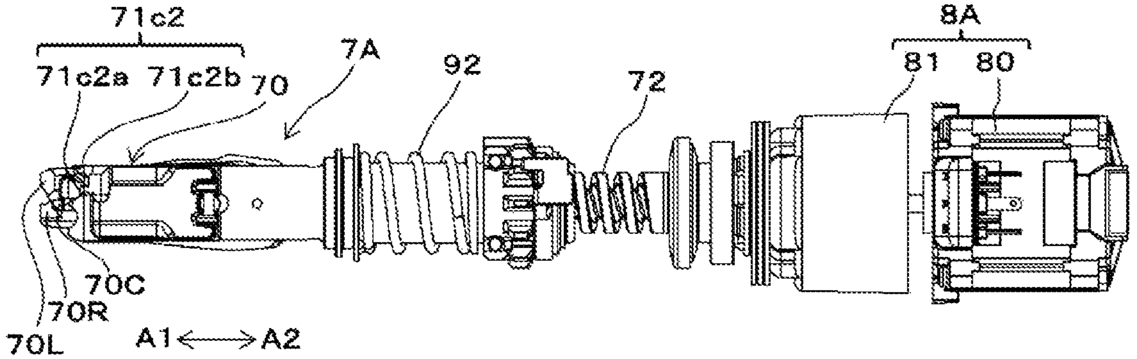
FIG. 3B is a bottom view illustrating the configuration of the main part of the reinforcing bar binding machine in operation according to the embodiment.
Figure 3C:
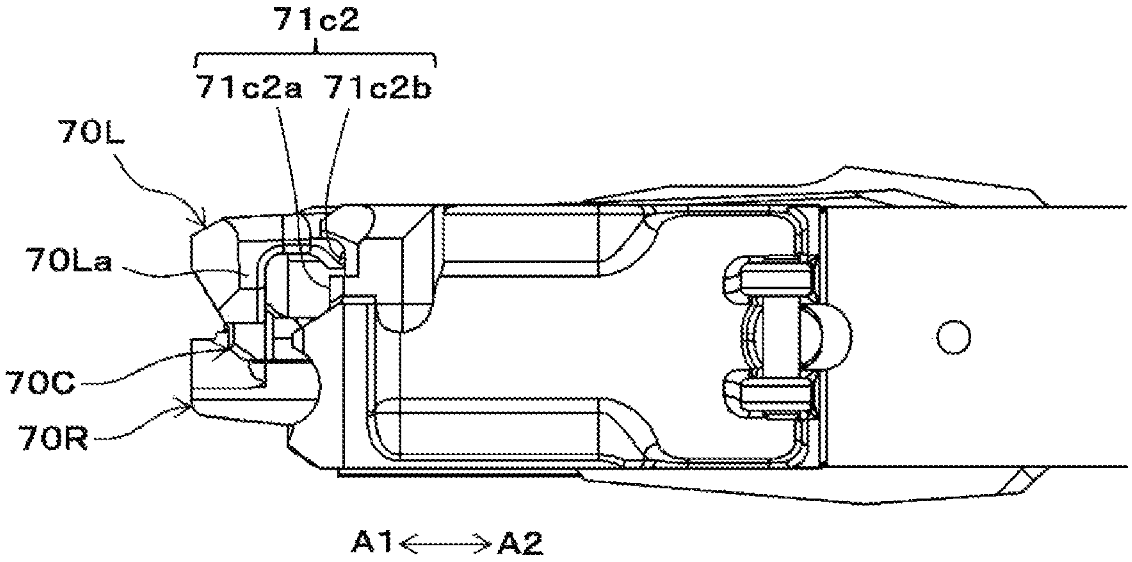
FIG. 3C is a bottom view illustrating the configuration of the main part of the reinforcing bar binding machine in operation according to the embodiment.
Figure 3D:
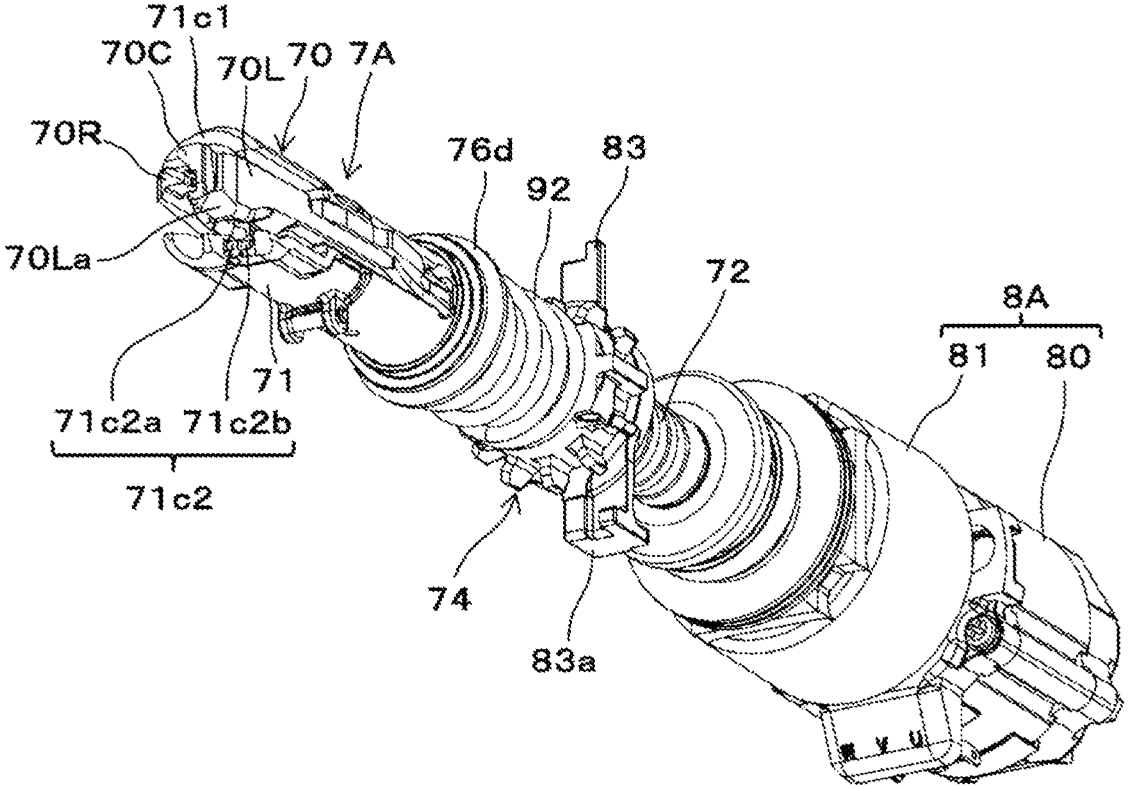
FIG. 3D is a perspective view illustrating the configuration of the main part of the reinforcing bar binding machine in operation according to the embodiment.
Figure 3E:
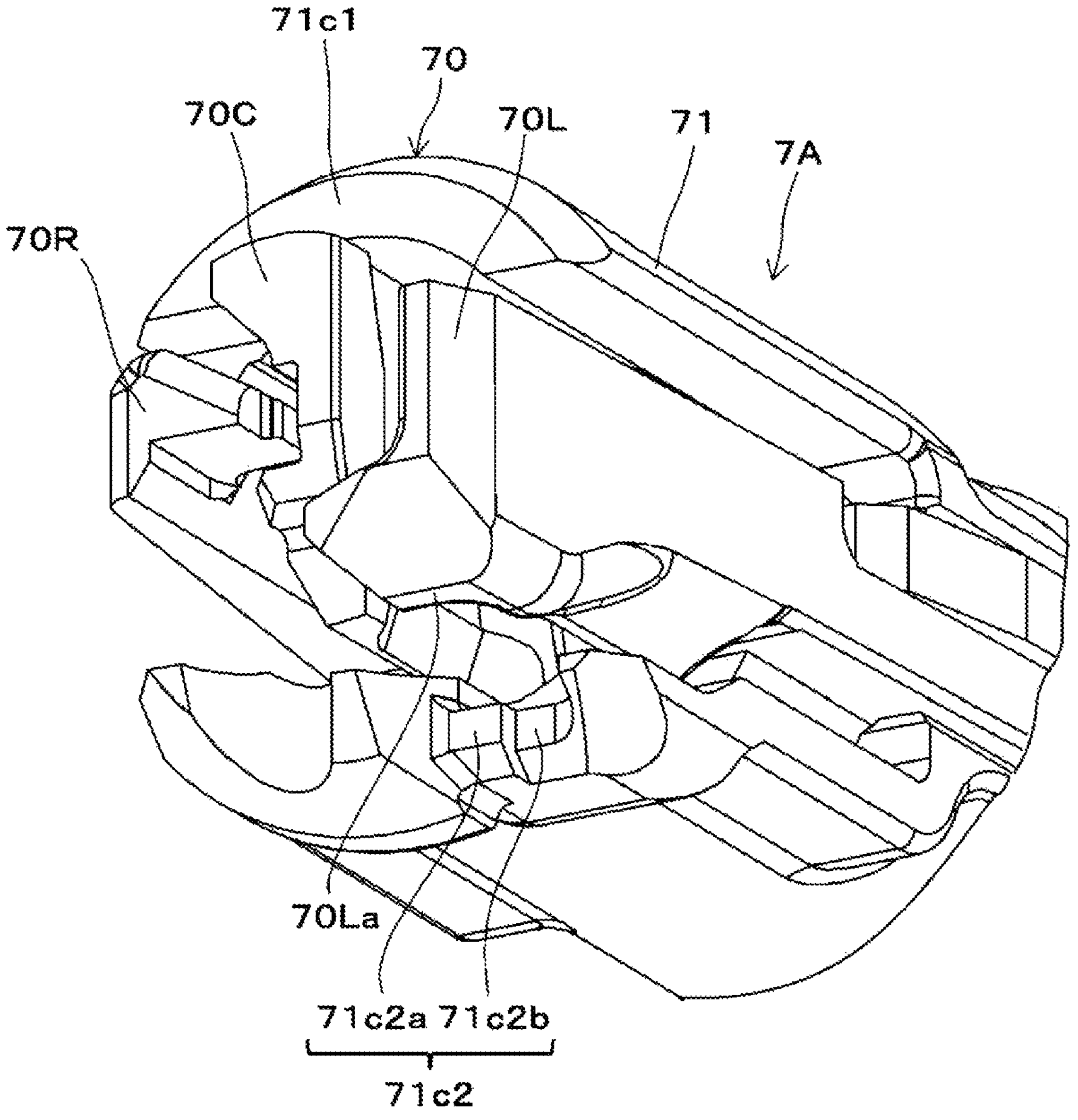
FIG. 3E is a perspective view illustrating the configuration of the main part of the reinforcing bar binding machine in operation according to the embodiment.

FIG. 2A is a side view illustrating the configuration of the main part of the reinforcing bar binding machine according to the embodiment, FIG. 2B is a top view illustrating the configuration of the main part of the reinforcing bar binding machine according to the embodiment, and FIG. 2C is a top sectional view illustrating the configuration of the main part of the reinforcing bar binding machine according to the embodiment. FIG. 3A is a side view illustrating the configuration of the main part of the reinforcing bar binding machine in operation according to the embodiment, FIGS. 3B and 3C are bottom views illustrating the configuration of the main part of the reinforcing bar binding machine in operation according to the embodiment, and FIGS. 3D and 3E are perspective views illustrating the configuration of the main part of the reinforcing bar binding machine in operation according to the embodiment. Then, the details of the binding part 7A, a connecting structure of the binding part 7A and the driving part 8A, and a configuration of holding the wire W at the binding part 7A before cutting at the cutter 6A will be described with reference to each drawing.

The binding part 7A includes the wire locking body 70 to which the wire W is locked, and a rotating shaft 72 for operating the wire locking body 70. In the binding part 7A and the driving part 8A, the rotating shaft 72 and the motor 80 are connected via the speed reducer 81, and the rotating shaft 72 is driven by the motor 80 via the speed reducer 81.

The wire locking body 70 includes a center hook 70C connected to the rotating shaft 72, a first side hook 70L and a second side hook 70R that are opened and closed with respect to the center hook 70C, and a sleeve 71 that operates the first side hook 70L and the second side hook 70R in conjunction with the rotational movement of the rotating shaft 72.

The binding part 7A may be divided into a front side where the center hook 70C, the first side hook 70L, and the second side hook 70R are provided, and a rear side where the rotating shaft 72 is connected to the speed reducer 81.

The center hook 70C, the first side hook 70L, and the second side hook 70R are examples of locking members. Further, the center hook 70C is an example of a fixed locking member, the first side hook 70L is an example of a first open and close locking member, and the second side hook 70R is an example of a second open and close locking member.

The center hook 70C is connected to the front end, which is one end of the rotating shaft 72, via a configuration that enables rotation with respect to the rotating shaft 72 and also enables movement in the axial direction integrally with the rotating shaft 72.

The leading end side of the first side hook 70L, which is one end along the axial direction of the rotating shaft 72, is positioned on one side with respect to the center hook 70C. Further, the rear end side of the first side hook 70L, which is the other end along the axial direction of the rotating shaft 72, is rotatably supported by the center hook 70C by a shaft 71*b*.

The leading end side of the second side hook 70R, which is one end along the axial direction of the rotating shaft 72, is positioned on the other side with respect to the center hook 70C. Further, the rear end side of the second side hook 70R, which is the other end along the axial direction of the rotating shaft 72, is rotatably supported by the center hook 70C by the shaft 71*b*.

As a result, the wire locking body 70 is opened and closed in a direction in which the leading end side of the first side hook 70L separates away from and approaches the center hook 70C by the rotational movement about the shaft 71*b* as the fulcrum. Further, the leading end side of the second side hook 70R is opened and closed in a direction in which the leading end side separates away from and approaches the center hook 70C.

The rotating shaft 72 is connected to the speed reducer 81 at a rear end, which is the other end, via a connecting part 72*b* having a configuration that is integrally rotatable with the speed reducer 81 and is also movable in the axial direction with respect to the speed reducer 81. The connecting part 72*b* includes a spring 72*c* that biases the rotating shaft 72 rearward, which is a direction of approaching the speed reducer 81, and restricts the position of the rotating shaft 72 along the axial direction. As a result, the rotating shaft 72 is configured such that, by the force pushing rearward applied by the spring 72*c*, the rotating shaft 72 is movable forward, that is, movable in a direction of separating away from the speed reducer 81. Therefore, upon application of the force that moves the wire locking body 70 forward along the axial direction, the rotating shaft 72 is movable forward by the force pushing rearward applied by the spring 72*c*.

The sleeve 71 is an example of a linear movement rotating member, which is shaped such that a range of a predetermined length from the end at the forward direction indicated by an arrow A1 along the axial direction of the rotating shaft 72 is divided into two parts in the radial direction, receiving therein the first side hook 70L and the second side hook 70R in openable and closable manner. Further, the sleeve 71 has a cylindrical shape that covers the circumference of the rotating shaft 72, and includes a convex portion (not illustrated) protruding from an inner peripheral surface of a tubular space where the rotating shaft 72 is inserted, in which the convex portion enters a groove portion of a feed screw 72*a* formed along the axial direction on the outer periphery of the rotating shaft 72. When the rotating shaft 72 is rotated, the sleeve 71 is moved in the forward and rearward direction, which is a direction along the axial direction of the rotating shaft 72, according to the rotation direction of the rotating shaft 72 by the action of the convex portion (not illustrated) and the feed screw 72*a* of the rotating shaft 72. Further, the sleeve 71 is rotated integrally with the rotating shaft 72.

The sleeve 71 includes an opening and closing pin 71*a* for opening and closing the first side hook 70L and the second side hook 70R.

The opening and closing pin 71*a* is inserted into an opening and closing guide hole 73 provided in the first side hook 70L and the second side hook 70R. The opening and closing guide hole 73 extends along a moving direction of the sleeve 71, and has a shape that converts the linear movement of the opening and closing pin 71*a* that is moved in conjunction with the sleeve 71 into an opening and closing movement by the rotation of the first side hook 70L and the second side hook 70R about the shaft 71*b* as a fulcrum.

In the wire locking body 70, as the sleeve 71 is moved in the rearward direction as indicated by an arrow A2, by the locus of the opening and closing pin 71*a* and the shape of the opening and closing guide hole 73, the first side hook 70L and the second side hook 70R are moved in the direction of separating away from the center hook 70C by the rotational movement about the shaft 71*b* as a fulcrum.

As a result, the first side hook 70L and the second side hook 70R are opened with respect to the center hook 70C, and the feeding path for the wire W to pass through is formed between the first side hook 70L and the center hook 70C, and between the second side hook 70R and the center hook 70C.

When the first side hook 70L and the second side hook 70R are opened with respect to the center hook 70C, the wire W fed by the wire feeder 3A is passed between the center hook 70C and the first side hook 70L. The wire W passed between the center hook 70C and the first side hook 70L is guided to the curl forming part 5A. Then, the wire W formed with the winding curl by the curl forming part 5A and guided to the binding part 7A is passed between the center hook 70C and the second side hook 70R.

In the wire locking body 70, as the sleeve 71 is moved in the forward direction as indicated by the arrow A1, by the locus of the opening and closing pin 71*a* and the shape of the opening and closing guide hole 73, the first side hook 70L and the second side hook 70R are moved in a direction of approaching the center hook 70C by the rotational movement about the shaft 71*b* as a fulcrum. As a result, the first side hook 70L and the second side hook 70R are closed with respect to the center hook 70C.

When the first side hook 70L is closed with respect to the center hook 70C, the wire W held between the first side hook 70L and the center hook 70C is locked in a movable form between the first side hook 70L and the center hook 70C. Further, when the second side hook 70R is closed with respect to the center hook 70C, the wire W held between the second side hook 70R and the center hook 70C is locked in such a form that the wire W does not come off from between the second side hook 70R and the center hook 70C.

In the wire locking body 70, the second side hook 70R starts moving in the direction of approaching the center hook 70C and locks the wire W, and simultaneously with locking, the first side hook 70L starts moving in the direction of approaching the center hook 70C and locks the wire W. Noted that the first side hook 70L may start moving in the direction of approaching the center hook 70C after the second side hook 70R starts moving in the direction of approaching the center hook 70C and before the wire W is locked between the second side hook 70R and the center hook 70C.

The wire locking body 70 includes a bending part 71*c*1 that pushes the leading end side, which is one end of the wire W, in a predetermined direction and bends the wire W to form the wire W into a predetermined shape. Further, the wire locking body 70 includes a bending part 71*c*2 that holds the wire W before being cut by the cutter 6A, while also pushing the end side, which is the other end of the wire W cut by the cutter 6A, in a predetermined direction and bending the wire W, thus forming the wire W into a predetermined shape.

The sleeve 71 has such a shape that the end at the forward direction as indicated by the arrow A1 is divided into two parts of the first side hook 70L and the second side hook 70R with the center hook 70C held therebetween, and includes the bending part 71*c*1 formed at the front end at a position on an upper side in the non-rotating region, and the bending part 71*c*2 formed at the front end at a position on a lower side.

The sleeve 71 is moved in the forward and rearward direction, which is one direction along the axial direction of the rotating shaft 72 indicated by the arrows A1 and A2, so that the bending part 71*c*2 forming the first member of the wire holding part and a come-off prevention part 70La, which protrudes from the leading end of the first side hook 70L toward the second side hook R and forms the second member of the wire holding part, are relatively moved in a direction of approaching each other and in a direction of separating away from each other.

As a result, the sleeve 71 is moved in the forward direction indicated by the arrow A1 to push the wire W passed between the center hook 70C and the first side hook 70L with the bending part 71*c*2. The bending part 71*c*2 holds the wire W in cooperation with the come-off prevention part 70La of the first side hook 70L.

The bending part 71*c*2 is configured to press the wire W against the come-off prevention part 70La of the first side hook 70L and bend the wire W to hold the wire W. Therefore, in the configuration in which the reinforcing bars S are bound with the two wires W, when the bending of the two wires W is started at the same timing, the load at the start of the bending movement is increased.

Therefore, in a configuration in which the reinforcing bars S are bound by using two wires, in order to shift the timing at which the bending of the two wires W starts, the bending part 71*c*2 includes a first wire holding part 71*c*2*a* that first starts bending one of the wires W, and a second wire holding part 71*c*2*b* that starts bending of the other wire W after the first wire holding part 71*c*2*a* starts bending the one wire W.

In the bending part 71*c*2, the first wire holding part 71*c*2*a* and the second wire holding part 71*c*2*b* are arranged along the direction in which the two wires W are parallel to each other, and the first wire holding part 71*c*2*a* projects in the forward direction as indicated by the arrow A1 with respect to the second wire holding part 71*c*2*b*.

As a result, the sleeve 71 is moved in the forward direction indicated by the arrow A1, so that the first wire holding part 71*c*2*a* first comes into contact with one of the wires W. Then, the second wire holding part 71*c*2*b* comes into contact with the other wire W at a timing delayed according to the distance between the first wire holding part 71*c*2*a* and the second wire holding part 71*c*2*b*.

The first wire holding part 71*c*2*a* and the second wire holding part 71*c*2*b* are provided in the rearward direction along the axial direction of the rotating shaft 72 indicated by the arrow A2 and in the downward direction orthogonal to the axial direction of the rotating shaft 72 with respect to the come-off prevention part 70La of the first side hook 70L in the non-rotating region of the sleeve 71. As a result, the first wire holding part 71*c*2*a* and the second wire holding part 71*c*2*b* come into contact with the wire W between the come-off prevention part 70La of the first side hook 70L and the cutter 6A, that is, on the lower side of the come-off prevention part 70La of the first side hook 70L.

Further, after the wire W is cut by the cutter 6A, the sleeve 71 is moved in the forward direction as indicated by the arrow A1 so that the leading end side of the wire W locked by the center hook 70C and the second side hook 70R is pushed by the bending part 71*c*1 and bent toward the reinforcing bars S side. Further, the sleeve 71 is moved in the forward direction as indicated by the arrow A1 to be locked by the center hook 70C and the first side hook 70L, and the end side of the wire W cut by the cutter 6A is pushed by the bending part 71*c*2 and bent toward the reinforcing bars S side.

The binding part 7A includes a rotation restriction part 74 that restricts the rotation of the wire locking body 70 and the sleeve 71 that are rotated in conjunction with the rotational movement of the rotating shaft 72. The rotation restriction part 74 is provided with a rotation restriction blade 74*a* on the sleeve 71 and is provided with a rotation restriction claw 74*b* on the main body 10A.

The rotation restriction blade 74*a* is configured by providing a plurality of convex portions radially protruding from the outer periphery of the sleeve 71 at predetermined intervals in the circumferential direction of the sleeve 71. The rotation restriction blade 74*a* is fixed to the sleeve 71 and is moved and rotated integrally with the sleeve 71.

The rotation restriction part 74 locks the wire W with the wire locking body 70, winds the wire W on the reinforcing bars S, and then cuts the wire W with the cutter 6A while the wire W is held by the bending part 71*c*2 of the sleeve 71, and further, the rotation restriction blade 74*a* is locked to the rotation restriction claw 74*b* in the operating range in which the wire W is bent and formed by the bending parts 71*c*1 and 71*c*2 of the sleeve 71. When the rotation restriction blade 74*a* is locked with the rotation restriction claw 74*b*, the rotation of the sleeve 71 in conjunction with the rotation of the rotating shaft 72 is restricted, and the sleeve 71 is moved in the forward and rearward direction by the rotational movement of the rotating shaft 72.

Further, in the operating range in which the wire W locked by the wire locking body 70 is twisted, the rotation restriction part 74 is released from being locked with the rotation restriction claw 74*b* of the rotation restriction blade 74*a*. When the rotation restriction blade 74*a* is released from being locked with the rotation restriction claw 74*b*, the sleeve 71 is rotated in conjunction with the rotation of the rotating shaft 72. In the wire locking body 70, the center hook 70C, the first side hook 70L, and the second side hook 70R that lock the wire W are rotated in conjunction with the rotation of the sleeve 71. In the operating range of the sleeve 71 and the wire locking body 70 along the axial direction of the rotating shaft 72, the operating range in which the wire W is locked by the wire locking body 70 is referred to as a first operating range. Further, the operating range for twisting the wire W locked by the wire locking body 70 in the first operating range is referred to as a second operating range.

The binding part 7A is provided such that a moving member 83 is movable in conjunction with the sleeve 71. The moving member 83 is rotatably attached to the sleeve 71, is not in conjunction with the rotation of the sleeve 71, and is moved in the forward and rearward direction in conjunction with the sleeve 71.

The moving member 83 includes an engagement part 83*a* that engages with the transmission mechanism 62. In the binding part 7A, when the moving member 83 is moved in the forward and rearward direction in conjunction with the sleeve 71, the transmission mechanism 62 transmits the movement of the moving member 83 to the movable blade 61 to rotate the movable blade 61. As a result, the movable blade 61 is rotated in a predetermined direction by the movement of the sleeve 71 moving in the forward direction, and the wire W is cut.

The binding part 7A includes a tension applying spring 92 so that binding can be performed while tension is applied on the wire W. The tension applying spring 92 is provided outside the sleeve 71, and biases the sleeve 71 and the wire locking body 70 in the direction of separating away from the contacting portion 91 along the axial direction of the rotating shaft 72. The tension applying spring 92 is formed of, for example, a coil spring that expands and contracts in the axial direction, and is fitted on the outer periphery of the sleeve 71 between the rotation restriction blade 74*a* and a support frame 76*d* that rotatably and axially slidably supports the sleeve 71. When the tension applying spring 92 is formed of a coil spring, the inner diameter is configured to be greater than the outer diameter of the sleeve 71. The tension applying spring 92 is not limited to the coil spring that expands and contracts in the axial direction, and accordingly, the tension applying spring 92 may be a leaf spring, a torsion coil spring, one or a plurality of disc springs, or the like having a configuration that biases the sleeve 71 along the axial direction of the rotating shaft 72.

The tension applying spring 92 is compressed between the support frame 76*d* and the rotation restriction blade 74*a* according to the position of the sleeve 71 along the axial direction of the rotating shaft 72, and biases the sleeve 71 rearward, which is the direction of separating away from the contacting portion 91 along the axial direction of the rotating shaft 72. As a result, the tension applying spring 92 biases the wire locking body 70 provided with the sleeve 71 in the direction of maintaining the tension applied to the wire W with the movement of feeding the wire W in the reverse direction and winding the wire W on the reinforcing bar S.

As a result, when the sleeve 71 is moved forward and compressed, the tension applying spring 92 applies tension to the wire W that is cut by the cutter 6A after wound on the reinforcing bar S with a larger force than the force applied in the direction in which the wire W wound on the reinforcing bars S loosens. Therefore, it is possible to bind the wire W after cutting while applying tension thereto.

Further, the wire locking body 70 is configured to be movable forward as the sleeve 71 is applied with the force pushing rearward by the tension applying spring 92 and also as the rotating shaft 72 is applied with the force pushing rearward by the spring 72*c*.

<Operation Example of Reinforcing Bar Binding Machine According to Embodiment>

Figure 4A:
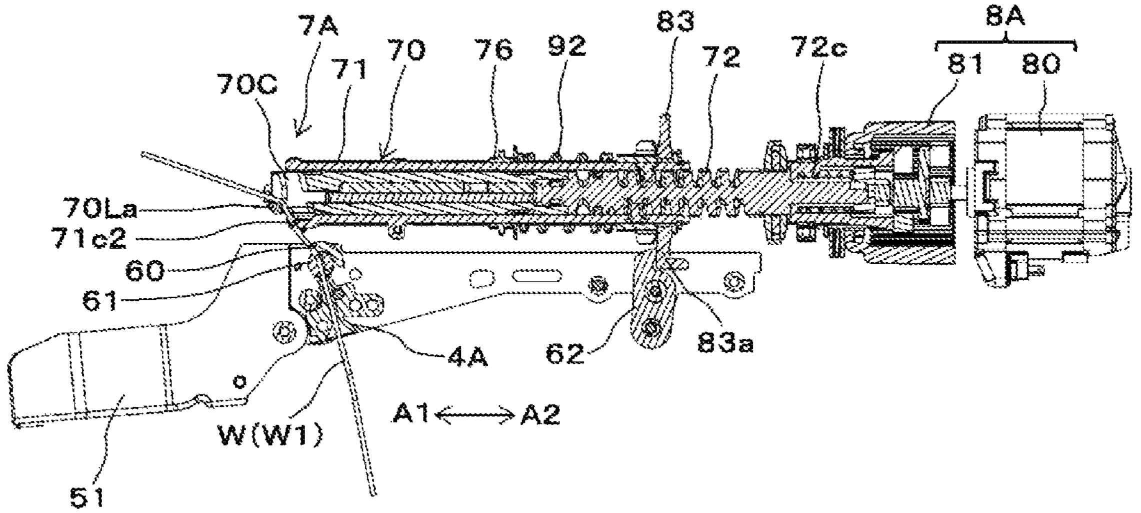
FIG. 4A is a side view illustrating the main part of the reinforcing bar binding machine according to the embodiment.
Figure 4B:
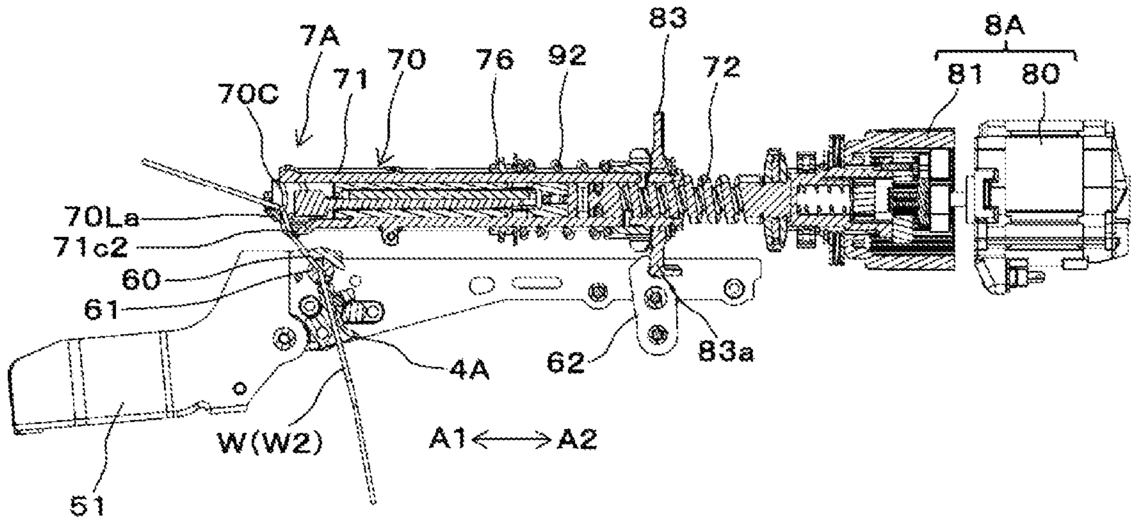
FIG. 4B is a side view illustrating the main part of the reinforcing bar binding machine according to the embodiment.
Figure 4C:
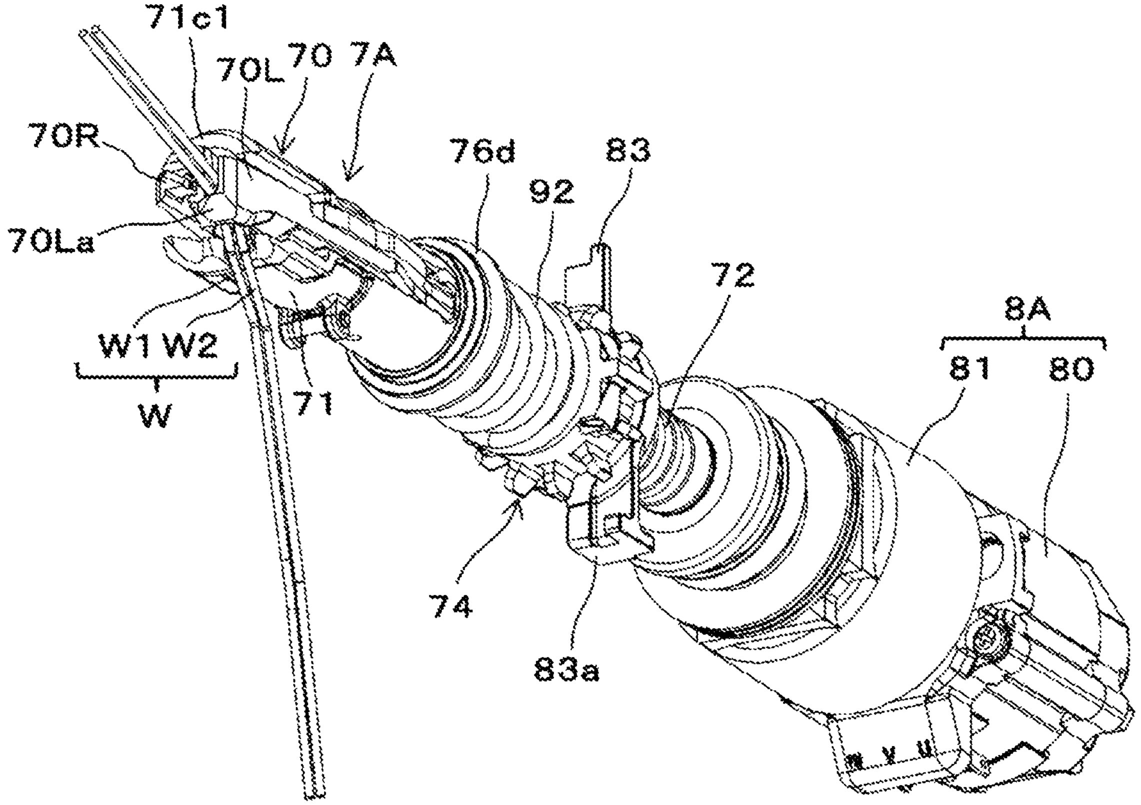
FIG. 4C is a perspective view illustrating the main part of the reinforcing bar binding machine according to the embodiment.

FIGS. 4A and 4B are side views illustrating the main part of the reinforcing bar binding machine according to the embodiment, and FIG. 4C is a perspective view illustrating the main part of the reinforcing bar binding machine according to the embodiment, which illustrates the operation at the time of wire holding and cutting.

The operation of binding the reinforcing bars S with the wire W by a reinforcing bar binding machine 1A according to an exemplary embodiment will be described below with reference to each drawing.

The reinforcing bar binding machine is in a standby state, which is the state in which the wire W is held between the pair of feed gears 30, and the leading end of the wire W is positioned between the holding position of the feed gear 30 and the fixed blade 60 of the cutter 6A. Further, in the standby state, the reinforcing bar binding machine 1A is in a state in which the wire locking body 70 is moved in the rearward direction as indicated by the arrow A2, the first side hook 70L is opened with respect to the center hook 70C, and the second side hook 70R is opened with respect to the center hook 70C, as illustrated in FIG. 2B. Further, in the standby state, the reinforcing bar binding machine 1A is in a state in which the rotation restriction blade 74*a* is separated from the tension applying spring 92, and the sleeve 71 and the wire locking body 70 are not biased rearward by the tension applying spring 92.

When the reinforcing bars S are inserted between the curl guide 50 and the inductive guide 51 of the curl forming part 5A, and the trigger 12A is operated, the feed motor (not illustrated) is driven in the forward rotation direction, and the wire W is fed by the wire feeder 3A in the positive direction as indicated by the arrow F.

In the case of a configuration in which the reinforcing bars S are bound with a plurality of wires W, such as two wires W for example, the two wires W are fed in parallel along the axial direction of the loop Ru formed by these wires W by the wire guide 4A.

The wires W fed in the positive direction are passed between the center hook 70C and the first side hook 70L and are fed to the curl guide 50 of the curl forming part 5A. By passing through the curl guide 50, the wire W is formed with a winding curl that is looped around the reinforcing bars S.

The wire W formed with the winding curl by the curl guide 50 is guided to the inductive guide 51 and further fed by the wire feeder 3A in the positive direction, and guided between the center hook 70C and the second side hook 70R by the inductive guide 51. Then, the wire W is fed until the leading end thereof is brought into contact with the feed restriction part 90. When the wire W is fed to a position where the leading end thereof is brought into contact with the feed restriction part 90, driving of the feed motor (not illustrated) is stopped.

After stopping feeding the wire W in the positive direction, the motor 80 is driven in the forward rotation direction. In the sleeve 71, in the first operating range in which the wire W is locked by the wire locking body 70, the rotation restriction blade 74*a* is locked to the rotation restriction claw 74*b*, so that the rotation of the sleeve 71 in conjunction with the rotation of the rotating shaft 72 is restricted. As a result, the rotation of the motor 80 is converted into linear movement, and the sleeve 71 is moved in the direction of the arrow A1 which is the forward direction.

When the sleeve 71 is moved in the forward direction, the opening and closing pin 71*a* is passed through the opening and closing guide hole 73. As a result, the first side hook 70L is moved in a direction of approaching the center hook 70C by the rotational movement about the shaft 71*b* as the fulcrum. When the first side hook 70L is closed with respect to the center hook 70C, the wire W held between the first side hook 70L and the center hook 70C is locked in a movable form between the first side hook 70L and the center hook 70C.

Further, the second side hook 70R is moved in the direction of approaching the center hook 70C by the rotational movement about the shaft 71*b* as a fulcrum. When the second side hook 70R is closed with respect to the center hook 70C, the wire W held between the second side hook 70R and the center hook 70C is locked in such a form that the wire W does not come off from between the second side hook 70R and the center hook 70C. In the reinforcing bar binding machine 1A, in the first operating range in which the wire W is locked by the wire locking body 70, the sleeve 71 and the wire locking body 70 are not biased rearward by the tension applying spring 92, and during the movement of the sleeve 71 and the wire locking body 70 in the direction of the arrow A1 which is the forward direction, the load by the tension applying spring 92 is not applied.

After advancing the sleeve 71 to the position where the wire W is locked by the movement of closing the first side hook 70L and the second side hook 70R, the rotation of the motor 80 is temporarily stopped, and the feed motor (not illustrated) is driven in the reverse rotation direction.

As a result, the pair of feed gears 30 are reversed, and the wire W held between the pair of feed gears 30 is fed in the opposite direction as indicated by the arrow R. Since the leading end side of the wire W is locked in a form so as not to come off between the second side hook 70R and the center hook 70C, the wire W is wound on the reinforcing bars S by the movement of feeding the wire W in the opposite direction.

After winding the wire W on the reinforcing bars S and stopping driving the feed motor (not illustrated) in the reverse rotation direction, by driving the motor 80 in the forward rotation direction, the sleeve 71 is further moved in the forward direction as indicated by the arrow A1.

In the case of the configuration in which the reinforcing bars S are bound by the two wires W, by moving the sleeve 71 in the forward direction as indicated by the arrow A1, the first wire holding part 71*c*2*a* comes into contact with one wire W1 of the two wires W passed between the center hook 70C and the first side hook 70L. When the sleeve 71 is further moved in the forward direction, the one wire W1 is pressed against the come-off prevention part 70La of the first side hook 70L by the first wire holding part 71*c*2*a*, so that the one wire W1 is bent between the come-off prevention part 70La and the cutter 6A in the forward direction along the axial direction of the rotating shaft 72 as indicated by the arrow A1 so as to conform to the come-off prevention part 70La, as illustrated in FIG. 4A.

As a result, the one wire W1 is held between the first wire holding part 71*c*2*a* and the come-off prevention part 70La in a form of being held in the forward and rearward direction, which is one direction along the axial direction of the rotating shaft 72 as indicated by the arrows A1 and A2, and in the vertical direction, which is the other direction that is orthogonal to the axial direction of the rotating shaft 72.

The movement of the sleeve 71 in the forward direction is transmitted to the cutter 6A by the transmission mechanism 62, so that the movable blade 61 is rotated. When the movable blade 61 is rotated, due to the shape of the fixed blade 60 and the movable blade 61, cutting of the one wire W1 held between the first wire holding part 71*c*2*a* and the come-off prevention part 70La is started at a timing prior to cutting the other wire W2.

As the sleeve 71 is moved in the forward direction, the one wire W1 is started to be bent by the first wire holding part 71*c*2*a*, and then almost simultaneously with the timing of completing cutting the one wire W1, the second wire holding part 71*c*2*b* is brought into contact with the other wire W2. When the sleeve 71 is moved further in the forward direction, the other wire W2 is pressed against the come-off prevention part 70La of the first side hook 70L by the second wire holding part 71*c*2*b*, so that the other wire W2 is bent between the come-off prevention part 70La and the cutter 6A in the forward direction along the axial direction of the rotating shaft 72 as indicated by the arrow A1 so as to conform to the come-off prevention part 70La, as illustrated in FIG. 4B.

As a result, the other wire W2 is held between the second wire holding part 71*c*2*b* and the come-off prevention part 70La in a form of being held in the forward and rearward direction, which is one direction along the axial direction of the rotating shaft 72 as indicated by the arrows A1 and A2, and in the vertical direction, which is the other direction that is orthogonal to the axial direction of the rotating shaft 72. Further, the cutter 6A starts cutting the one wire W1 before the timing at which the second wire holding part 71*c*2*b* starts holding the other wire W2.

When the other wire W2 is held between the second wire holding part 71*c*2*b* and the come-off prevention part 70La and the sleeve 71 is moved further in the forward direction, the other wire W2 held between the second wire holding part 71*c*2*b* and the come-off prevention part 70La is cut by the movement of the fixed blade 60 and the movable blade 61.

As described above, after the wire W is wound on the reinforcing bars S, one wire W1 of the two wires W before cutting passed between the center hook 70C and the first side hook 70L is held between the first wire holding part 71*c*2*a* forming the bending part 71*c*2 of the sleeve 71 and the come-off prevention part 70La of the first side hook 70L, thereby suppressing the wire W1 before cutting, which is wound on the reinforcing bars S, from loosening. Further, the other wire W2 is held between the second wire holding part 71*c*2*b* forming the bending part 71*c*2 of the sleeve 71 and the come-off prevention part 70La of the first side hook 70L, thereby suppressing the wire W2 before cutting, which is wound on the reinforcing bars S, from loosening.

In the configuration in which the wire W is cut between a portion of being passed between the center hook 70C and the first side hook 70L and a portion of being held in the pair of feed gears 30, when the wire W is cut at the corresponding position, the tension applied to the wire W by being held in the pair of feed gears 30 is released, and the wire W wound on the reinforcing bars S is loosened before being twisted.

On the other hand, in the present embodiment, after the wire W is wound on the reinforcing bars S, the wire W before cutting that is passed between the center hook 70C and the first side hook 70L is held between the first wire holding part 71*c*2*a* and the second wire holding part 71*c*2*b* forming the bending part 71*c*2 of the sleeve 71, and the come-off prevention part 70La of the first side hook 70L. As a result, the wire W wound on the reinforcing bars S is suppressed from loosening before being twisted. Further, by shifting the timing of holding and cutting the one wire W1 from the timing of holding and cutting the other wire W2, the load at the start of holding the wires W is reduced as compared with the case in which the holding of the two wires W is started at the same time, and the load at the start of cutting the wires W is reduced as compared with the case in which the cutting of the two wires W is started at the same time.

Further, when the wire W is cut, the tension applied to the wire W is released so that the sleeve 71 tends to move in the forward direction. When the sleeve 71 is moved in the forward direction, the force for pulling the wire W locked by the wire locking body 70 rearward is decreased, and the wire W wound on the reinforcing bars S loosens before being twisted.

On the other hand, with the reinforcing bar binding machine 1A according to the present embodiment, in the operating range in which the sleeve 71 and the wire locking body 70 are moved in the forward direction to cut the wire W, the rotation restriction blade 74*a* comes into contact with the tension applying spring 92, and the tension applying spring 92 is compressed between the support frame 76*d* and the rotation restriction blade 74*a*, so that the sleeve 71 and the wire locking body 70 are biased rearward by the tension applying spring 92.

As a result, by suppressing the forward movement of the sleeve 71, the decrease in the force that pulls the wire W locked by the wire locking body 70 rearward is suppressed, thereby suppressing the loosening of the wire W wound on the reinforcing bars S before twisting.

When the sleeve 71 and the wire locking body 70 are biased rearward by the tension applying spring 92 in the entire first operating range in which the wire W is locked by the wire locking body 70, the load applied to the motor 80 is increased.

Therefore, as described above, in the reinforcing bar binding machine 1A, in the standby state, the rotation restriction blade 74*a* is separated from the tension applying spring 92, and in the first operating range in which the wire W is locked by the wire locking body 70, the sleeve 71 and the wire locking body 70 are not biased rearward by the tension applying spring 92 in the initial operating range in which the first side hook 70L and the second side hook 70R are closed. As a result, in the initial operating range of the first operating range in which the wire W is locked by the wire locking body 70, the movement of the sleeve 71 and the wire locking body 70 in the direction of the arrow A1 which is the forward direction does not involve the application of load due to the load by which the tension applying spring 92 biases the sleeve 71 and the wire locking body 70 in the rearward direction. Therefore, it is possible to suppress an increase in the load applied to the motor 80 in the region where the load due to the tension applying spring 92 is unnecessary.

On the other hand, the rotating shaft 72 is connected to the speed reducer 81 via the connecting part 72*b* having a configuration that is integrally rotatable with the speed reducer 81 and is also movable in the axial direction with respect to the speed reducer 81. Between the standby position and the initial operating range of the first operating range in which the wire W is locked by the wire locking body 70, the sleeve 71 and the wire locking body 70 are not biased rearward by the tension applying spring 92, and accordingly, in the initial operating range of the first operating range, the tension applying spring 92 cannot restrict the position of the rotating shaft 72 in the axial direction. Therefore, the connecting part 72*b* includes the spring 72*c* that biases the rotating shaft 72 rearward which is the direction of approaching the speed reducer 81. As a result, the position of the rotating shaft 72 is restricted by the force pushing rearward applied by the spring 72*c*, unless a force that moves the rotating shaft 72 in the forward direction is applied, exceeding the biasing force of the spring 72*c*.

Therefore, by suppressing the increase in the load applied to the motor 80 in the region where the load due to the biasing of the tension applying spring 92 is not required, it is possible to suppress an increase in the load applied to the motor 80 or the like in the entire binding cycle, and it is possible to suppress a decrease in the durability of the parts. Further, by providing the spring 72*c*, it is possible to suppress inadvertent movement of the rotating shaft 72 in a region where the biasing force by the tension applying spring 92 is not applied.

By driving the motor 80 in the forward rotation direction, the sleeve 71 is moved in the forward direction as indicated by the arrow A1, and almost simultaneously with cutting the wire W, the bending part 71*c*1 is moved in the direction of approaching the reinforcing bars S. As a result, the leading end side of the wire W locked by the center hook 70C and the second side hook 70R is pressed toward the reinforcing bars S side by the bending part 71*c*1 and bent toward the reinforcing bars S side about the locking position as a fulcrum. By further moving the sleeve 71 forward, the wire W locked between the second side hook 70R and the center hook 70C is held in a state of being held by the bending part 71*c*1.

Further, the wire W is held between the first wire holding part 71*c*2*a* and the second wire holding part 71*c*2*b* forming the bending part 71*c*2 of the sleeve 71 and the come-off prevention part 70La of the first side hook 70L, and the end side of the wire W cut by the cutter 6A is further pressed toward the reinforcing bar S side by the bending part 71*c*2, and bent toward the reinforcing bar S side about the locking position as a fulcrum. By further moving the sleeve 71 forward, the wire W locked between the first side hook 70L and the center hook is held in a state of being held between the bending part 71*c*2.

After bending the leading end side and the end side of the wire W toward the reinforcing bars S side, the motor 80 is further driven in the forward rotation direction, so that the sleeve 71 is moved further forward. When the sleeve 71 is moved to a predetermined position and reaches the operating range where the wire W locked by the wire locking body 70 is twisted, the rotation restriction blade 74*a* is released from being locked with the rotation restriction claw 74*b*.

As a result, by further driving the motor 80 in the forward rotation direction, the sleeve 71 is rotated in conjunction with the rotating shaft 72, and the wire W locked by the wire locking body 70 is twisted.

In the binding part 7A, in the second operating range in which the sleeve 71 is rotated and twists the wire W, as the wire W locked by the wire locking body 70 is twisted, the wire locking body 70 is subjected to a force that pulls forward along the axial direction of the rotating shaft 72. Meanwhile, moving the sleeve 71 forward to a position where the sleeve 71 is rotatable causes the tension applying spring 92 to be further compressed, and the sleeve 71 receives the force pushing rearward applied by the tension applying spring 92.

As a result, when the force that moves the wire locking body 70 and the rotating shaft 72 forward along the axial direction is applied to the wire locking body 70, the sleeve 71 receives the force pushing rearward applied by the tension applying spring 92, and also, the rotating shaft 72 is moved forward while receiving the force pushing rearward applied by the spring 72*c*, and twists the wire W while being moved forward.

Therefore, as the portion of the wire W locked by the wire locking body 70 is pulled rearward and the tension is applied in the tangential direction of the reinforcing bars S, the wire W is pulled so as to be in close contact with the reinforcing bars S. In the binding part 7A, in a second operating range in which the sleeve 71 is rotated and twists the wire W, when the wire locking body 70 is further rotated in conjunction with the rotating shaft 72, the wire locking body 70 and the rotating shaft 72 are moved in the forward direction which is the direction of decreasing a gap between the twisted portion of the wire W and the reinforcing bars S, resulting in the wire W being further twisted.

Therefore, the wire W is twisted as the wire locking body 70 and the rotating shaft 72 are moved forward while receiving the force pushing rearward applied by the tension applying spring 92 and the spring 72*c*, so that the gap between the twisted portion of the wire W and the reinforcing bars S is decreased, and the wire W comes into close contact with the reinforcing bars S and in a form that conforms to the reinforcing bars S. As a result, the loosening of the wire W before twisting can be removed, and the wire W can be bound in a state of being in close contact with the reinforcing bars S.

When it is detected that the load applied to the motor 80 is maximized by twisting the wire W, the forward rotation of the motor 80 is stopped. Then, by driving the motor 80 in the reverse rotation direction, the rotating shaft 72 is rotated in the reverse direction, and the sleeve 71 is rotated in the reverse direction following the reverse rotation of the rotating shaft 72, such that the rotation restriction blade 74*a* is locked with the rotation restriction claw 74*b*, thus restricting the rotation of the sleeve 71 in conjunction with the rotation of the rotating shaft 72. As a result, the sleeve 71 is moved in the direction of the arrow A2 which is the rearward direction.

When the sleeve 71 is moved in the rearward direction, the bending parts 71*c*1 and 71*c*2 are separated from the wire W, and the wire W held by the bending parts 71*c* 1 and 71*c*2 is released. Further, when the sleeve 71 is moved in the rearward direction, the opening and closing pin 71*a* is passed through the opening and closing guide hole 73. As a result, the first side hook 70L is moved in a direction of separating away from the center hook 70C by the rotational movement about the shaft 71*b* as a fulcrum. Further, the second side hook 70R is moved in a direction of separating away from the center hook 70C by the rotational movement about the shaft 71*b* as a fulcrum. As a result, the wire W comes off from the wire locking body 70.

What is claimed is:

1. A binding machine comprising:

a wire feeder configured to feed a wire;

a curl forming part making a path for looping the wire fed by the wire feeder in one direction around an object to be bound;

a cutter configured to cut the wire fed by the wire feeder in another direction opposite to the one direction and wound on the object to be bound; and a binding part configured to twist the wire wound on the object to be bound and cut by the cutter, wherein the binding part includes:

a wire locking body to which the wire is locked;

a rotating shaft configured to operate the wire locking body; and a wire holding part including a first member and a second member relatively movable in a direction of approaching each other and in a direction of separating away from each other, wherein the wire holding part is configured to bend the wire, which is fed by the wire feeder in the another direction and wound on the object to be bound, in an axial direction of the rotating shaft by the relative movement of the first member and the second member approaching each other, and to hold the wire, wherein the wire holding part is configured to bend and hold a part of the wire on another end side of the wire opposite to a leading end side with respect to a loop of the wire around the object to be bound, and wherein the cutter is provided in a wire feeding path between the wire feeder and the wire holding part, and is configured to cut the wire after the wire is held by the wire holding part.

2. The binding machine according to claim 1, wherein the wire holding part is configured to hold the wire with the first member and the second member at least in a direction along the axial direction of the rotating shaft.

3. The binding machine according to claim 2, wherein the wire holding part is configured to hold the wire with the first member and the second member in a further direction orthogonal to the axial direction of the rotating shaft.

4. A binding machine comprising:

a wire feeder configured to feed a wire;

a curl forming part making a path for looping the wire fed by the wire feeder in one direction around an object to be bound;

a cutter configured to cut the wire fed by the wire feeder in another direction opposite to the one direction and wound on the object to be bound; and a binding part configured to twist the wire wound on the object to be bound and cut by the cutter, wherein the binding part includes:

a wire locking body to which the wire is locked;

a rotating shaft configured to operate the wire locking body; and a wire holding part including a first member and a second member relatively movable in a direction of approaching each other and in a direction of separating away from each other, wherein the wire holding part is configured to bend the wire, which is fed by the wire feeder in the another direction and wound on the object to be bound, in an axial direction of the rotating shaft by the relative movement of the first member and the second member approaching each other, and to hold the wire, wherein the cutter is provided in a wire feeding path between the wire feeder and the wire holding part, and is configured to cut the wire after the wire is held by the wire holding part, wherein the wire locking body includes:

a linear movement rotating member movable in the axial direction of the rotating shaft while also being rotatable together with the rotating shaft; and at least a pair of locking members relatively movable in a direction of approaching each other and in a direction of separating away from each other, with a movement of the linear movement rotating member in which the linear movement rotating member moves in the axial direction of the rotating shaft, and wherein the wire holding part is configured such that the first member is provided on the locking member, and the second member is provided on the linear movement rotating member.

5. The binding machine according to claim 1, wherein the wire locking body includes:

a fixed locking member;

a first open and close locking member movable in a direction of approaching the fixed locking member and in a direction of separating away from the fixed locking member; and a second open and close locking member movable in a direction of approaching the fixed locking member and in a direction of separating away from the fixed locking member, wherein the wire fed by the wire feeder is passed between the first open and close locking member and the fixed locking member, and the wire formed with a winding curl by the curl forming part is passed between the second open and close locking member and the fixed locking member, and at the same time as the second open and close locking member starts moving in the direction of approaching the fixed locking member, or after the second open and close locking member starts moving in the direction of approaching the fixed locking member, and before the wire is locked between the second open and close locking member and the fixed locking member, the first open and close locking member starts moving in the direction of approaching the fixed locking member.

6. The binding machine according to claim 1, wherein the wire feeder is configured to feed two wires in parallel, and the object to be bound is bound by the two wires.

7. The binding machine according to claim 6, wherein the wire holding part includes a first wire holding part that holds one of the two wires, and a second wire holding part that holds another one of the two wires, and a timing at which the first wire holding part starts holding the one wire differs from a timing at which the second wire holding part starts holding the another wire.

8. The binding machine according to claim 6, wherein a timing at which the cutter starts cutting the one wire differs from a timing at which the cutter starts cutting the another wire.

9. A binding machine comprising:

a wire feeder configured to feed a wire;

a curl forming part making a path for looping the wire fed by the wire feeder in one direction around an object to be bound;

a cutter configured to cut the wire fed by the wire feeder in another direction opposite to the one direction and wound on the object to be bound; and a binding part configured to twist the wire wound on the object to be bound and cut by the cutter, wherein the binding part includes:

a wire locking body to which the wire is locked;

a rotating shaft configured to operate the wire locking body; and a wire holding part including a first member and a second member relatively movable in a direction of approaching each other and in a direction of separating away from each other, wherein the wire holding part is configured to bend the wire, which is fed by the wire feeder in the another direction and wound on the object to be bound, in an axial direction of the rotating shaft by the relative movement of the first member and the second member approaching each other, and to hold the wire, wherein the cutter is provided in a wire feeding path between the wire feeder and the wire holding part, and is configured to cut the wire after the wire is held by the wire holding part, wherein the wire feeder is configured to feed two wires in parallel, and the object to be bound is bound by the two wires, wherein the wire holding part includes a first wire holding part that holds one of the two wires, and a second wire holding part that holds another one of the two wires, a timing at which the first wire holding part starts holding the one wire differs from a timing at which the second wire holding part starts holding the another wire, wherein the wire holding part is configured such that, the timing at which the first wire holding part starts holding the one wire is earlier than the timing at which the second wire holding part starts holding the another wire, and wherein the cutter is configured such that, the timing at which the cutter starts cutting the one wire is earlier than the timing at which the cutter starts cutting the another wire, and before the timing at which the second wire holding part starts holding the another wire.

* * * * *